US012581047B2

(12) United States Patent
Li et al.

(10) Patent No.: US 12,581,047 B2
(45) Date of Patent: Mar. 17, 2026

(54) SCALING OBJECT TO BE PROCESSED FROM VR IMAGE BASED ON MOTION VECTOR OF USER IN TARGET DIRECTION DETERMINED FROM SIX-DEGREES-OF-FREEDOM DATA OF VR HEADSET

(71) Applicant: BEIJING ZITIAO NETWORK TECHNOLOGY CO., LTD., Beijing (CN)

(72) Inventors: Lei Li, Beijing (CN); Xinyu Cui, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 306 days.

(21) Appl. No.: 18/348,284

(22) Filed: Jul. 6, 2023

(65) Prior Publication Data

US 2024/0013404 A1    Jan. 11, 2024

(30) Foreign Application Priority Data

Jul. 8, 2022    (CN) ......................... 202210806626.6

(51) Int. Cl.
*H04N 13/139*        (2018.01)
*H04N 13/00*        (2018.01)
        (Continued)

(52) U.S. Cl.
CPC ......... *H04N 13/139* (2018.05); *H04N 13/117* (2018.05); *H04N 13/128* (2018.05);
        (Continued)

(58) Field of Classification Search
CPC .... H04N 13/10; H04N 13/106; H04N 13/111; H04N 13/117; H04N 13/128;
        (Continued)

(56) References Cited

U.S. PATENT DOCUMENTS 9,934,614 B2 *  4/2018  Ramsby ................. G06F 1/163
10,681,276 B2 *  6/2020  Järvenpää ......... G02B 27/0172
        (Continued)

OTHER PUBLICATIONS

Holliman, N.S. "Mapping perceived depth to regions of interest in stereoscopic images." In Stereoscopic displays and virtual reality systems XI (vol. 5291, pp. 117-128), SPIE (Year: 2004).*
        (Continued)

*Primary Examiner* — Scott A Rogers
(74) *Attorney, Agent, or Firm* — Alleman Hall LLP

(57)        ABSTRACT

The present disclosure provides an image processing method and apparatus, a device, and a medium. The method is applied in a virtual reality headset and includes: obtaining six-degree-of-freedom data of the virtual reality headset and a virtual reality image corresponding to the six-degree-of-freedom data; determining a motion vector of a user in a target direction based on the six-degree-of-freedom data; determining a to-be-processed object from the virtual reality image; and scaling the to-be-processed object based on the motion vector. In the present disclosure, stereoscopic scaling of a VR image displayed by a VR device is implemented to achieve a stereoscopic scaling effect of the image, thereby satisfying use requirements for a user.

15 Claims, 7 Drawing Sheets

(51) Int. Cl.

| | |
|---|---|
| *H04N 13/117* | (2018.01) |
| *H04N 13/128* | (2018.01) |
| *H04N 13/344* | (2018.01) |
| *H04N 13/366* | (2018.01) |
| *G06F 3/01* | (2006.01) |
| *G06F 3/0346* | (2013.01) |
| *G06T 3/02* | (2024.01) |
| *G06T 3/40* | (2024.01) |
| *G06T 7/11* | (2017.01) |
| *G06T 7/593* | (2017.01) |

(52) U.S. Cl.

CPC ......... *H04N 13/344* (2018.05); *H04N 13/366* (2018.05); *G06F 3/012* (2013.01); *G06F 3/0346* (2013.01); *G06T 3/02* (2024.01); *G06T 3/40* (2013.01); *G06T 7/11* (2017.01); *G06T 7/593* (2017.01); *G06T 2207/20021* (2013.01); *H04N 2013/0081* (2013.01); *H04N 2013/0085* (2013.01); *H04N 2013/0092* (2013.01)

(58) Field of Classification Search

CPC .. H04N 13/139; H04N 13/332; H04N 13/344; H04N 13/366; H04N 13/371; H04N 13/373; H04N 13/376; H04N 13/378; H04N 13/38; H04N 13/383; H04N 2013/0074; H04N 2013/0081; H04N 2013/0085; H04N 2013/0092; H04N 2213/005; G06T 7/10; G06T 7/11; G06T 7/20; G06T 7/215; G06T 7/223; G06T 7/246; G06T 7/50; G06T 7/536; G06T 7/55; G06T 7/579; G06T 7/593; G06T 7/596; G06T 7/70; G06T 7/73; G06T 2207/10021; G06T 2207/10028; G06T 2207/20021; G06T 2207/20112; G06T 3/02; G06T 3/40; G06F 3/011; G06F 3/012; G06F 3/0346; G06F 2203/04806; G06V 10/26; G06V 20/20

See application file for complete search history.

(56) References Cited

U.S. PATENT DOCUMENTS

| | | | | |
|---|---|---|---|---|
| 10,816,807 | B2 * | 10/2020 | Polcak | G02B 27/0955 |
| 10,976,809 | B2 * | 4/2021 | Li | G06V 20/20 |
| 11,182,958 | B2 * | 11/2021 | Evans | G06T 19/006 |
| 11,303,875 | B2 * | 4/2022 | Malaika | G06T 7/73 |
| 11,609,428 | B2 * | 3/2023 | Inatani | G06F 3/038 |
| 12,169,276 | B2 * | 12/2024 | Fortin-Deschenes | G02B 27/0093 |
| 2013/0147801 | A1 * | 6/2013 | Kurino | G06T 7/593 345/420 |
| 2020/0356164 | A1 * | 11/2020 | Yanagi | G06F 3/147 |
| 2024/0329729 | A1 * | 10/2024 | Johnson | G06F 3/011 |

OTHER PUBLICATIONS

Jones et al. "Controlling perceived depth in stereoscopic images." In Stereoscopic Displays and Virtual Reality Systems VIII (vol. 4297, pp. 42-53), SPIE (Year: 2001).*

\* cited by examiner

Original image                    Image after scaling

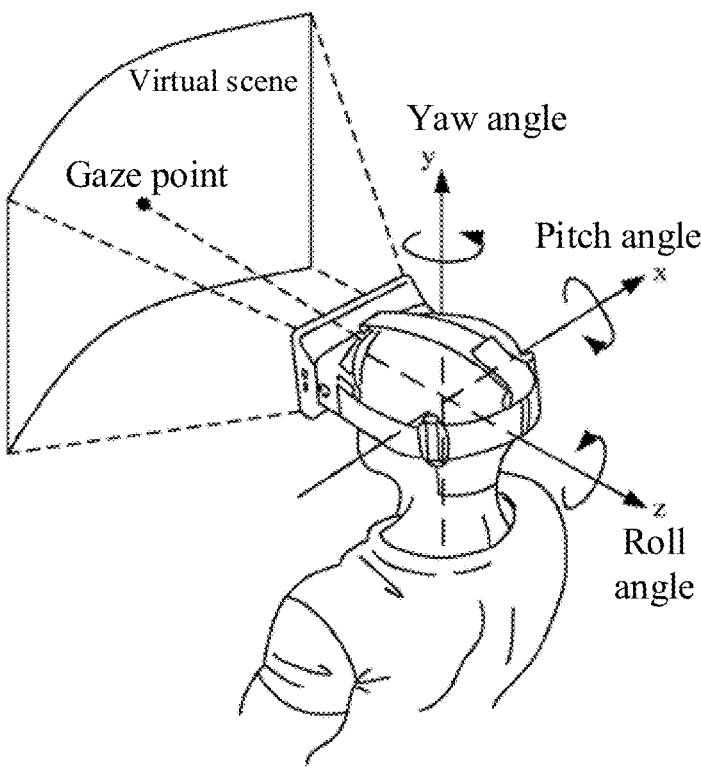

FIG. 3

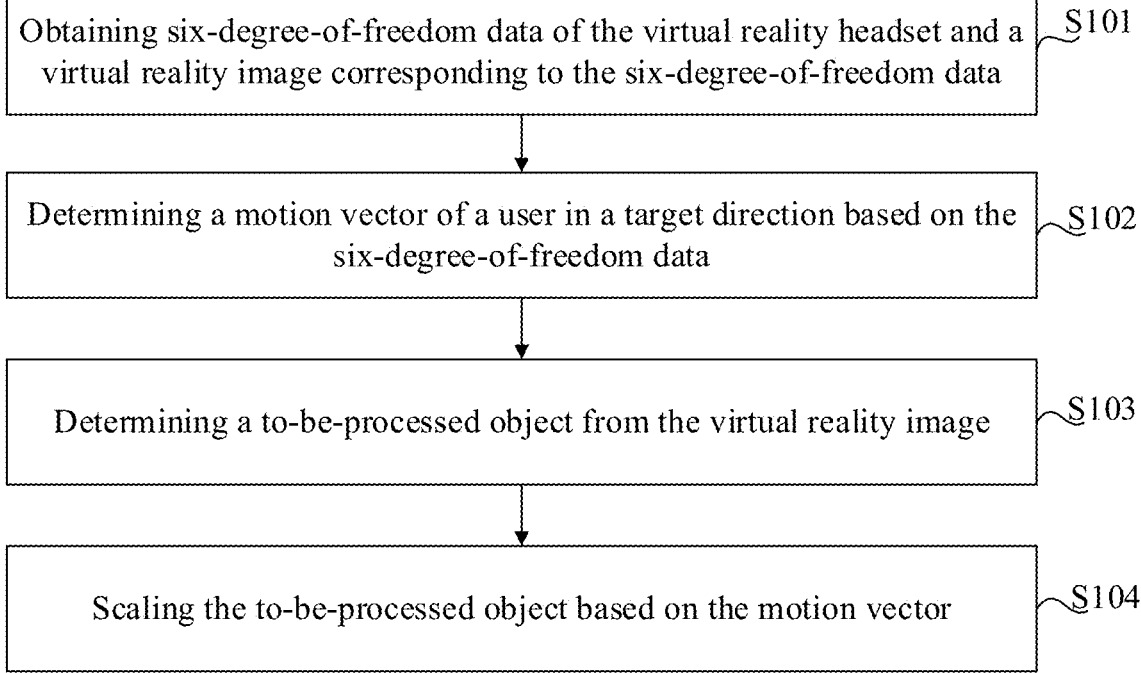

Obtaining six-degree-of-freedom data of the virtual reality headset and a virtual reality image corresponding to the six-degree-of-freedom data ⟋S101

Determining a motion vector of a user in a target direction based on the six-degree-of-freedom data ⟋S102

Determining a to-be-processed object from the virtual reality image ⟋S103

Scaling the to-be-processed object based on the motion vector ⟋S104

FIG. 4

Original VR image

VR image after scaling

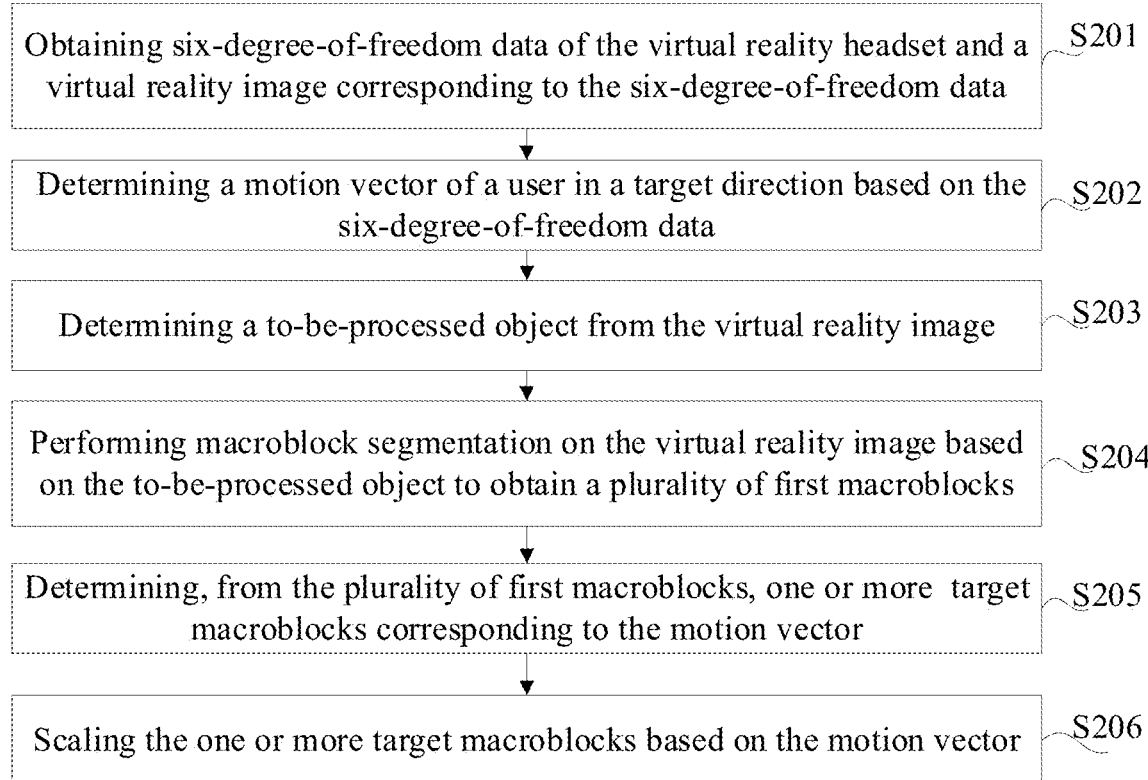

Obtaining six-degree-of-freedom data of the virtual reality headset and a virtual reality image corresponding to the six-degree-of-freedom data — S201

Determining a motion vector of a user in a target direction based on the six-degree-of-freedom data — S202

Determining a to-be-processed object from the virtual reality image — S203

Performing macroblock segmentation on the virtual reality image based on the to-be-processed object to obtain a plurality of first macroblocks — S204

Determining, from the plurality of first macroblocks, one or more target macroblocks corresponding to the motion vector — S205

Scaling the one or more target macroblocks based on the motion vector — S206

FIG. 7

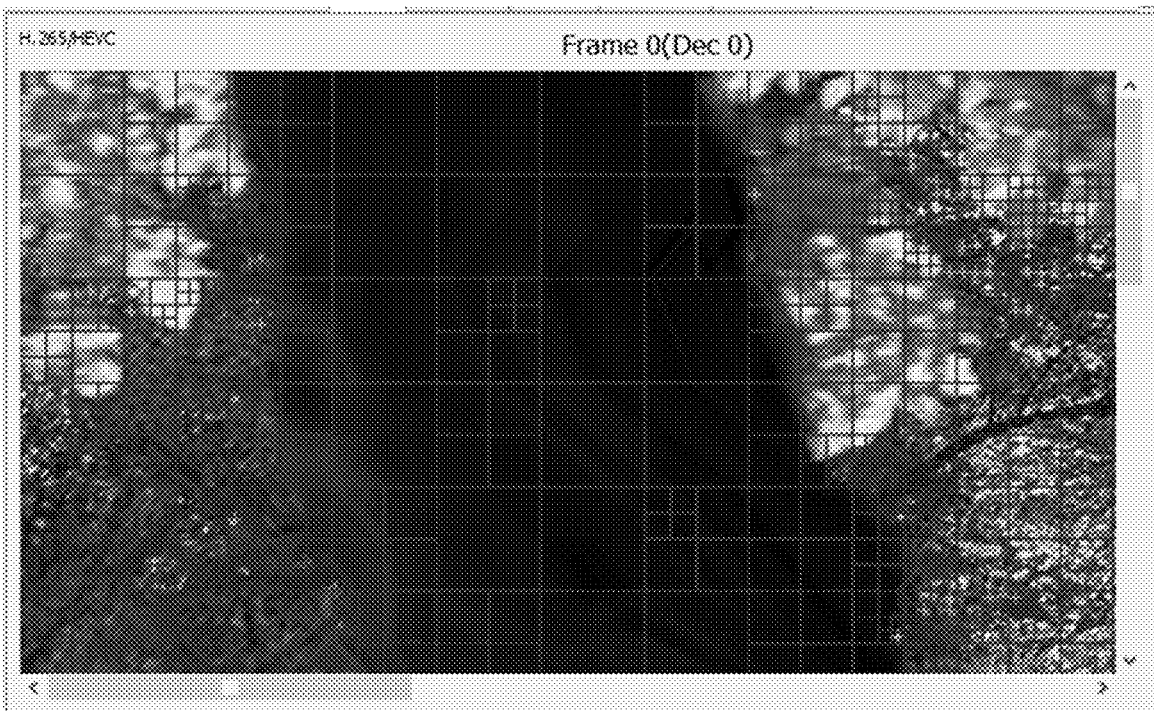

FIG. 8

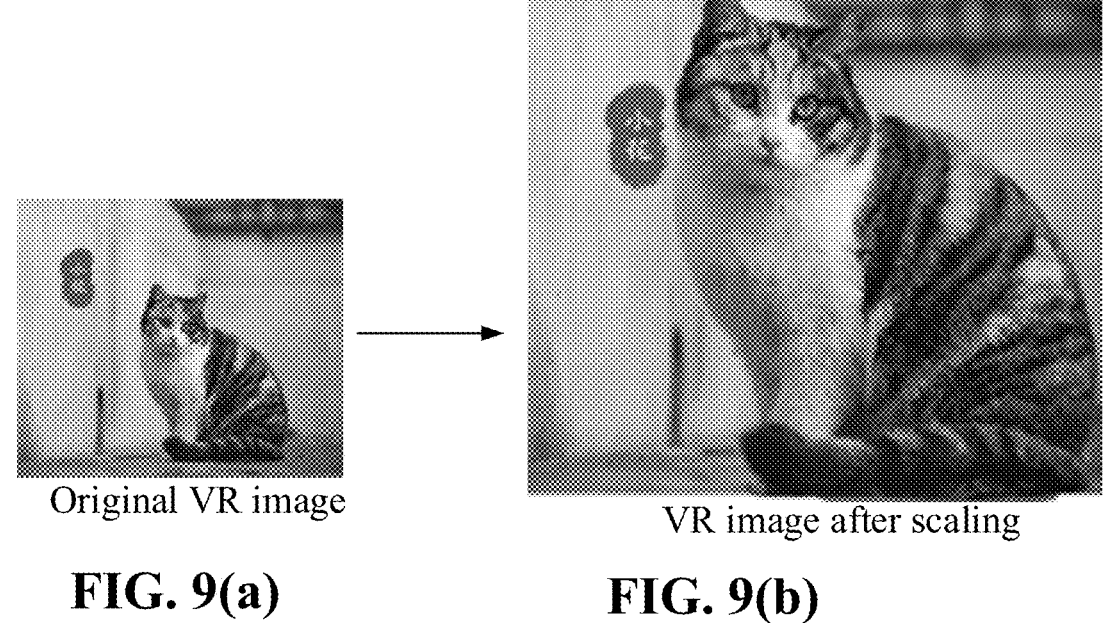

Original VR image

VR image after scaling

FIG. 9(a)              FIG. 9(b)

| |
|---|
| Obtaining six-degree-of-freedom data of the virtual reality headset and a virtual reality image corresponding to the six-degree-of-freedom data — S301 |
| Determining a motion vector of a user in a target direction based on the six-degree-of-freedom data — S302 |
| Performing a depth information extraction processing on the virtual reality image to obtain depth information — S303 |
| Performing a semantic segmentation processing on the virtual reality image to obtain a segmentation result — S304 |
| Determining the to-be-processed object from the virtual reality image based on the depth information and the segmentation result — S305 |
| Scaling the to-be-processed object based on the motion vector — S306 |

FIG. 10

SCALING OBJECT TO BE PROCESSED FROM VR IMAGE BASED ON MOTION VECTOR OF USER IN TARGET DIRECTION DETERMINED FROM SIX-DEGREES-OF-FREEDOM DATA OF VR HEADSET

CROSS REFERENCE OF RELATED APPLICATION

The present disclosure claims the priority of the Chinese patent application No. 202210806626.6 entitled "IMAGE PROCESSING METHOD AND APPARATUS, ELECTRONIC DEVICE, AND MEDIUM" and filed by BEIJING ZITIAO NETWORK TECHNOLOGY CO., LTD. on Jul. 8, 2022, which is hereby incorporated by reference in its entirety.

FIELD

The present disclosure relates to the field of virtual reality technologies, and more particularly, to an image processing method and apparatus, a device, and a medium.

BACKGROUND

A VR (Virtual Reality) device provides a user with a VR image to offer the user an immersive experience, such that the user has an immersive feeling. The VR image includes a 360° VR picture or VR video.

In the process of watching the VR image displayed by the VR device, the user may make different motions. For example, the user makes a motion approaching or getting away from an image. At this time, the VR device can adjust a size of the VR image in real time based on the motion of the user to achieve an effect similar to image scaling, thereby providing a better use experience for the user. At present, when the size of the VR image is adjusted, a mainstream encoding scheme H.264, H.265, or HEVC is generally used to encode a planar image. Motion data (planar motion vector data) about the user moving towards or away from the VR image is obtained while encoded data is obtained based on an algorithm or an implementation mode of hardware. Then, the size of the VR image is adjusted based on the planar motion vector data.

However, as illustrated in FIG. 1, the above-mentioned adjustment mode is to scale the whole VR image in equal-proportion, which cannot meet use requirements for the user in terms of bringing the user a stereoscopic and real VR scene.

SUMMARY

Embodiments of the present disclosure provide an image processing method and apparatus, a device, and a medium, which implement stereoscopic scaling of a VR image displayed by a VR device to achieve a stereoscopic scaling effect of the image and thus satisfy use requirements for a user.

In a first aspect, the embodiments of the present disclosure provide an image processing method. The image processing method is applied in a virtual reality headset and includes: obtaining six-degree-of-freedom data of the virtual reality headset and a virtual reality image corresponding to the six-degree-of-freedom data; determining a motion vector of a user in a target direction based on the six-degree-offreedom data; determining a to-be-processed object from the virtual reality image; and scaling the to-be-processed object based on the motion vector.

In a second aspect, the embodiments of the present disclosure provide an image processing apparatus. The image processing apparatus is configured in a virtual reality headset and includes: a data obtaining module configured to obtain six-degree-of-freedom data of the virtual reality headset and a virtual reality image corresponding to the six-degree-of-freedom data; a vector determining module configured to determine a motion vector of a user in a target direction based on the six-degree-of-freedom data; an object determining module configured to determine a to-be-processed object from the virtual reality image; and a processing module configured to scale the to-be-processed object based on the motion vector.

In third aspect, the embodiments of the present disclosure provide an electronic device. The electronic device includes: a processor; and a memory configured to store a computer program. The processor is configured to invoke and execute the computer program stored in the memory to perform the image processing method according to any of the embodiments of the first aspect.

In a fourth aspect, the embodiments of the present disclosure provide a computer-readable storage medium. The computer-readable storage medium is configured to store a computer program. The computer program enables a computer to perform the image processing method according to any of the embodiments of the first aspect.

In a fifth aspect, the embodiments of the present disclosure provide a computer program product. The computer program product includes program instructions. The program instructions, when executed on an electronic device, cause the electronic device to perform the image processing method according to any of the embodiments of the first aspect.

The technical solutions disclosed in the embodiments of the present disclosure have at least the following beneficial effects.

The motion vector of the user in a target direction is determined based on the obtained six-degree-of-freedom data, and the to-be-processed object is determined from the obtained virtual reality image corresponding to the six-degree-of-freedom data, and then the to-be-processed object is scaled based on the motion vector. Hence, based on the determined motion vector, the stereoscopic scaling of the VR image displayed by the VR device is performed to achieve the stereoscopic scaling effect of the image, thereby satisfying the use requirements for the user.

BRIEF DESCRIPTION OF THE DRAWINGS

In order to clearly explain technical solutions of embodiments of the present disclosure, drawings used in description of the embodiments will be briefly described below. Evidently, the drawings described below merely illustrate some embodiments of the present disclosure. Based on these drawings, other drawings can be obtained by those skilled in the art without any creative effort.

FIG. 3 is a schematic diagram of a wearing usage scenario of a Head Mounted Device (HMD) according to an embodiment of the present disclosure.

FIG. 4 is a schematic flowchart of an image processing method according to an embodiment of the present disclosure.

FIG. 7 is a schematic flowchart of another image processing method according to an embodiment of the present disclosure.

FIG. 8 is a schematic diagram of performing macroblock segmentation on a VR image to obtain a plurality of first macroblocks according to an embodiment of the present disclosure.

FIG. 9*a* is a schematic diagram of a VR original image according to an embodiment of the present disclosure.

FIG. 9*b* is a schematic diagram of an image obtained after scaling a to-be-processed object in a VR image according to an embodiment of the present disclosure.

FIG. 10 is a schematic flowchart of yet another image processing method according to an embodiment of the present disclosure.

DETAILED DESCRIPTION

Figure 1:
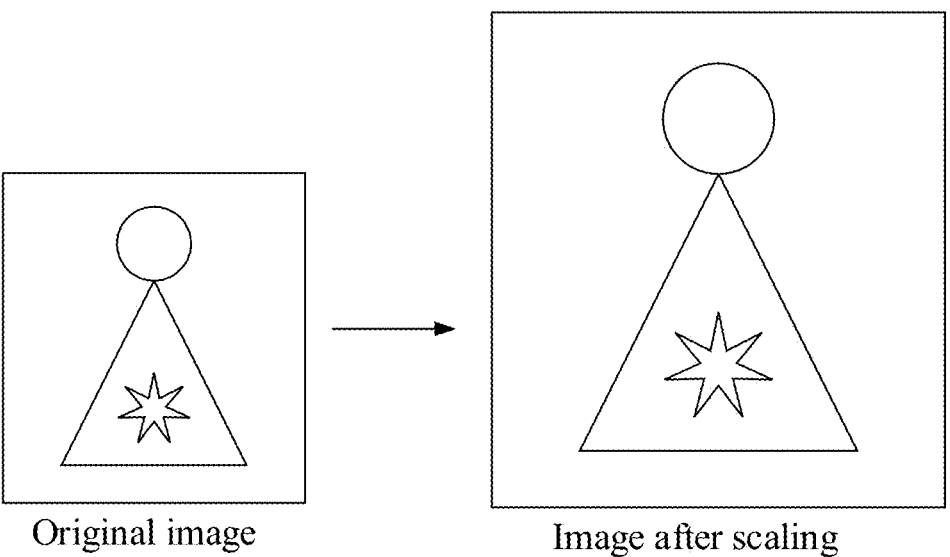
FIG. 1 is a schematic diagram of adjusting a size of a VR image based on a mainstream encoding scheme.

Technical solutions according to embodiments of the present disclosure will be described clearly and completely below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without any creative labor shall fall within the protection scope of the present disclosure.

It should be noted that terms such as "first" and "second" in the specification and claims of the present disclosure and the above accompanying drawings are only for distinguishing similar objects, rather than to describe a specific order or sequence. It should be understood that the data used in such a way may be interchanged as appropriate, so that the embodiments of the present application described herein can be implemented in an order other than those illustrated or described herein. In addition, terms "include", "have", and any variations thereof are intended to cover non-exclusive inclusions. For example, a process, method, system, product, or server that includes a series of steps or units is not necessarily limited to those clearly listed steps or units, but may also include other steps or units that are not clearly listed or are inherent to the process, method, product, or device.

The present disclosure is applicable to a scene in which when a VR image is displayed by a VR device, a size of the VR image is adjusted in real time based on a motion of a user to achieve an effect similar to image scaling. A mainstream encoding scheme H.264, H.265, or HEVC is currently used to encode a planar image. In the mainstream encoding scheme, encoded data is obtained and motion data (planar motion vector data) about the user moving towards or away from the VR image is obtained at the same time based on an algorithm or an implementation mode of hardware. Then, the size of the VR image is adjusted based on the planar motion vector data. However, the whole VR image is adjusted in a equal-proportion scaling way, which cannot meet use requirements for the user in terms of a stereoscopic and real VR scene. Therefore, an image processing method is designed with regard to this problem, through which a stereoscopic scaling of the VR image displayed by the VR device is implemented to achieve a stereoscopic scaling effect of the image and thus satisfy the use requirements for the user.

In order to facilitate understanding of the embodiments of the present disclosure, before describing each embodiment of the present disclosure, some concepts involved in all embodiments of the present disclosure are specifically interpreted in the followings as appropriate.

1) Virtual Reality (VR for short), which creates and experiences a technology of a virtual world, generates a virtual environment through calculation, is multi-source information (the VR mentioned herein includes at least visual perception, and may further include auditory perception, tactile perception, motion perception, even further include taste perception, olfactory perception, etc.), and realizes a simulation of syncretic and interactive three-dimensional dynamic views and physical behavior of the virtual environment, such that the user is immersed in a simulated virtual reality environment to implement applications of a plurality of virtual environments such as a map, a game, a video, education, medical treatment, simulation, collaborative training, marketing, assistance manufacturing, maintenance and repair.

2) A virtual reality device (VR device), which is a terminal implementing an effect of virtual reality, may generally be provided in forms of glasses, a Head Mount Display (HMD), and a contact lens for achieving the visual perception and other forms of perception. Of course, the virtual reality device is not limited thereto, and may be further miniaturized or enlarged based on actual requirements.

Optionally, the virtual reality device disclosed in the embodiments of the present disclosure may include, but is not limited to the following types.

2.1) A personal computer virtual reality (PCVR) device. The personal computer virtual reality (PCVR) device uses a PC terminal to perform related calculation and data output of a virtual reality function, and data outputted by the PC terminal is used by the external PCVR device to implement the effect of the virtual reality.

2.2) A mobile virtual reality device. The mobile virtual reality device supports setting up a mobile terminal (such as a smart phone) in various manners (for example, a head-mounted display is provided with a special card slot). The mobile terminal is in a wired or wireless connection with the mobile virtual reality device to perform a related calculation of a virtual reality function and output data to the mobile virtual reality device. For example, a user can watch a virtual reality video by means of an APP of the mobile terminal.

2.3) An all-in-one virtual reality device. The all-in-one virtual reality device has a processor configured to perform the related calculation of the virtual function, and thus has a function of independent virtual reality input and output, has no need to be connected to a PC terminal or a mobile terminal, and has a high degree of use freedom.

In order to clearly illustrate the technical solutions of the present disclosure, application scenarios of the technical solution of the present disclosure are described below. It should be understood that the technical solution of the present disclosure may be applied to the following scenarios, but is not limited thereto.

Figure 2:
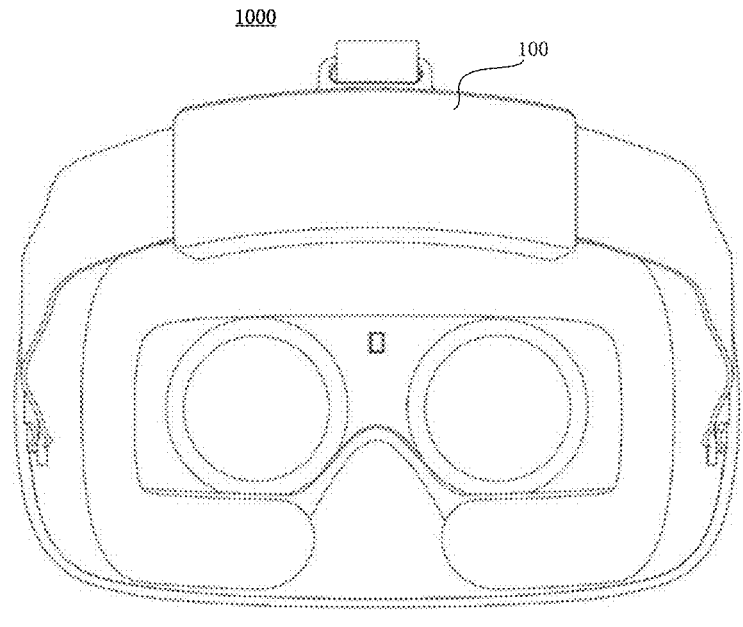
FIG. 2 is a schematic diagram of an application scenario according to an embodiment of the present disclosure.

For example, FIG. 2 is a schematic diagram of an application scenario according to an embodiment of the present disclosure. As illustrated in FIG. 2, an application scenario 1000 may include a virtual reality headset 100.

In the embodiments of the present disclosure, the virtual reality headset 100 may be a Head Mount Display (HMD) in the VR device. The HMD may be an HMD in a VR all-in-one headset. Certainly, in addition, the virtual reality headset 100 may alternatively be another headset, which is not specifically limited in the present disclosure.

In some optional implementations, as illustrated in FIG. 3, the virtual reality headset 100 is an HMD. The HMD is a device relatively light, ergonomically comfortable, and capable of providing a content with low latency and high resolution. A posture detection sensor, such as a nine-axis sensor, may be disposed in the HMD to detect a posture change of the HMD in real time. For example, in a case where the user wears the HMD, when a head posture of the user changes, the sensor can transmit real-time posture information of the head of the user to a processor in real time, so that the processor calculates a gaze point of sight of the user in the virtual environment based on the real-time posture information and then calculates, based on the gaze point, an image in a three-dimensional model of the virtual environment that is within an implementation range of the user, i.e., a virtual field of view, and displays the image on a display screen, so that people simulates the same immersive experience in the real environment.

It should be understood that the virtual reality headset 100 illustrated in FIG. 2 is merely illustrative and is not used as a specific limit to the present disclosure.

After the application scenario according to the embodiments of the present disclosure is introduced, an image processing method according to the embodiments of the present disclosure is described in detail below with reference to the accompanying drawings.

FIG. 4 is a schematic flowchart of an image processing method according to an embodiment of the present disclosure. The embodiment of the present disclosure may be applied to a scenario in which the size of the VR image is adjusted. The image processing method may be executed by an image processing apparatus to control a process of image adjustment. The image processing apparatus may be composed of hardware and/or software and may be integrated in an electronic device. The electronic device in the present disclosure is preferably a VR headset.

As illustrated in FIG. 4, the image processing method may include operations at the following blocks.

At block S101, six-degree-of-freedom data of the virtual reality headset and a virtual reality image corresponding to the six-degree-of-freedom data are obtained.

Degree of freedom refers to the number of directions in which the user can move in a 3D space, and the number of directions is the degree of freedom. The number of directions characterizing degree of freedom is six in total in the present disclosure.

In this embodiment, 6 Degree of Freedom (DoF) refers to an ability of the user to move on an X axis, Y axis, and Z axis in addition to an ability to rotate on the X axis, Y axis, and Z axis. That is, the 6DoF includes a translational degree of freedom and a rotational degree of freedom. The translational degree of freedom is divided into three types of forward/backward, upward/downward, leftward/rightward, and the rotational degree of freedom is divided into three types of pitch, roll, and yaw. That is, 6DoF may be composed of three types of translational degrees of freedom and three types of rotational degrees of freedom.

Given that the motion of a human body can be approximately divided into two categories of rotation and translation, and 6DoF is just composed of the rotational degree of freedom and the translational degree of freedom, the VR headset supporting 6DoF can simulate almost all head motions of the user.

That is, no matter how complex any potential motion of an object is, it can be expressed by a combination of translation and rotation, i.e., can be expressed by 6DoF data.

Exemplarily, in the present disclosure, the 6DoF data of the VR headset may be obtained in the following modes. Mode 1

The 6DoF data of the VR headset is collected in real time by controlling a sensor in the VR headset. In this way, the 6DoF data of the VR headset can be obtained.

The sensor may be a nine-axis sensor, or an inertial measurement unit, etc., which is not specifically limited herein.

Mode 2

A predetermined data structure is invoked, so as to obtain the 6DoF data from a 6DoF data collecting sensor through the data structure.

As an optional implementation, the predetermined data structure may be as follows:

```
bool   SensorManger::ConvertToHmdSensor(uint8_t*buf   ,   intlength   ,
RVR::RVRPoseHmdData& hmd_pose)
{
    WireLessType::TransPoseData*pose=(WireLessType::TransPoseData*)buf;
    hmd_pose.valid = true;
    hmd_pose.position.x = pose->position.x;
    hmd_pose.position.y = pose->position.y;
    hmd_pose.position.z = pose->position.z;
    hmd_pose.rotation.x = pose->rotation.x;
    hmd_pose.rotation.y = pose->rotation.y;
    hmd_pose.rotation.z = pose->rotation.z;
    hmd_pose.rotation.w = pose->rotation.w;
    hmd_pose.poseRecvTime = RVR::nowInNs( );
    hmd_pose.poseTimeStampUs = pose->poseTimeStampUs;
    hmd_pose.predictedTimeMs = pose->predictedTimeMs;
    hmd_pose.position.x = pose->position.x;
    hmd_pose.position.y = pose->position.y;
```

-continued

```
hmd_pose.position.z = pose->position.z;
hmd_pose.linearVelocity.x = pose->linearVelocity.x;
hmd_pose.linearVelocity.y = pose->linearVelocity.y;
hmd_pose.linearVelocity.z = pose->linearVelocity.z;
hmd_pose.linearAcceleration.x = pose->linearAcceleration.x;
hmd_pose.linearAcceleration.y = pose->linearAcceleration.y;
hmd_pose.linearAcceleration.z = pose->linearAcceleration.z;
hmd_pose.angularVelocity.x = pose->angularVelocity.x;
hmd_pose.angularVelocity.y = pose->angularVelocity.y;
hmd_pose.angularVelocity.z = pose->angularVelocity.z;
hmd_pose.angularAcceleration.x = pose->angularAcceleration.x;
hmd_pose.angularAcceleration.y = pose->angularAcceleration.y;
hmd_pose.angularAcceleration.z = pose->angularAcceleration.z;
    return true;
}
```

In addition, in the present disclosure, a virtual reality image corresponding to the 6DoF data may be further obtained from an image resource library in real time based on the obtained 6 DOF data.

The image resource library may be a database located at the VR headset, or a database in a backend server in communication connection with the VR headset, which is not specifically limited in the present disclosure.

It should be noted that the image resource library in the present disclosure may include image resources required by any VR application and image resources required by other VR devices.

At block S102, a motion vector of a user in a target direction is determined based on the six-degree-of-freedom data.

In the embodiments of the present disclosure, the target direction refers to a direction in which the user moves towards the VR image or moves away from the VR image.

The motion vector (MV) is a parameter determined based on the motion estimation.

A basic idea of motion estimation is to divide each frame in an image sequence into a plurality of macroblocks that do not overlap with each other, and consider that displacements of all pixels in a macroblock are the same, and then for each microblock, find a block most similar to the current block within a given specific search range of a reference frame based on a certain matching criterion, i.e., a matching block. Relative displacement between the matching block and the current block is the motion vector. The reference frame refers to a frame that needs to be referenced during encoding of IPB. IPB refers to a frame type, specifically an I frame represents an intra-frame encoding frame, a P frame represents a forward prediction encoding frame, and a B frame represents a bidirectional prediction interpolation encoding frame.

Figure 5:
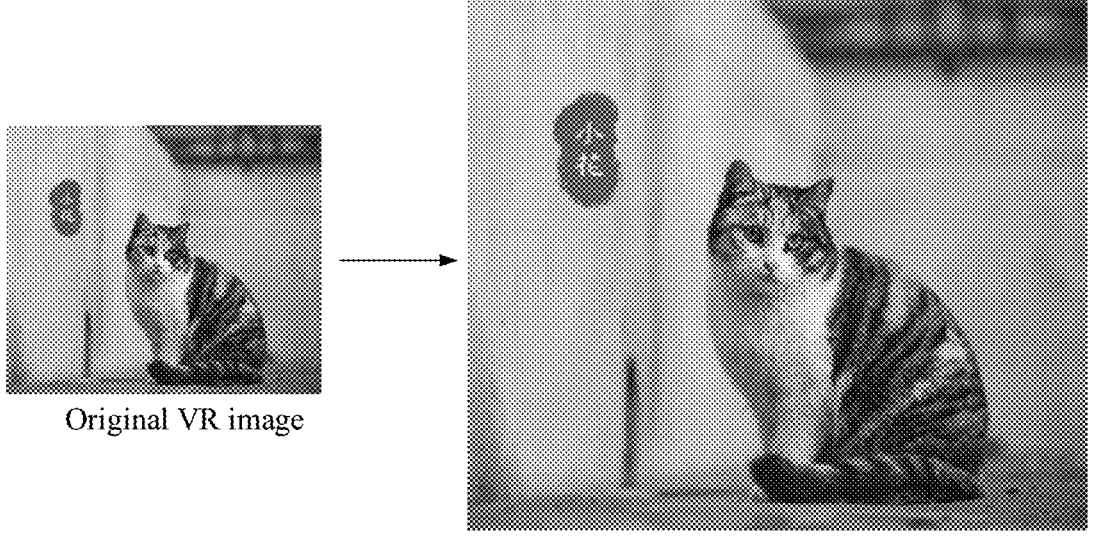
FIG. 5 is another schematic diagram of adjusting a size of a VR image based on a mainstream encoding scheme.

A mainstream encoding scheme H.264, H.265, or HEVC is currently used to encode a planar image. In the mainstream encoding scheme, encoded data is obtained and motion data (planar motion vector data) about the user moving towards or away from the VR image is obtained at the same time based on the algorithm or an implementation mode of hardware. In this way, the size of the VR image is adjusted based on the data of the planar motion vector. However, because the size of the VR image is adjusted based on the planar motion vector data, the whole VR image is scaled in equal-proportion to achieve a planar scaling effect, as illustrated in FIG. 5 for example.

Figure 6:
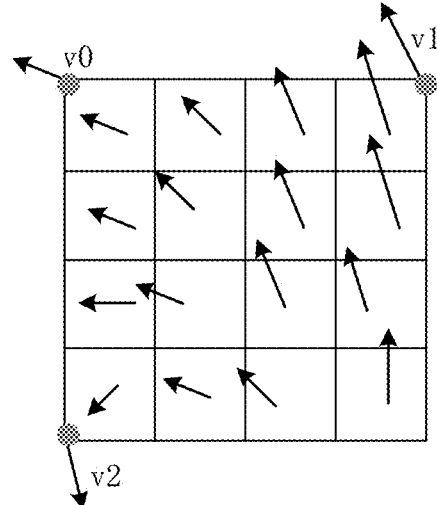
FIG. 6 is a schematic diagram of obtaining a 6-parameter affine model based on a 4-parameter affine model and a vector V2 according to an embodiment of the present disclosure.

However, a stereoscopic image scaling effect needs to be provided to the user in the VR scenario. In a 6-parameter affine model used in the H.266/VCC, a vector V2 may be added on a basis of a 4-parameter affine model (a translational motion model) of H.264, H.265, or HEVC, such that the scaling of the image is more stereoscopic, and details thereof refers to FIG. 6. Therefore, in the present disclosure, a motion vector may be calculated based on the obtained 6DoF data, and the motion vector is used as the vector V2 in the 6-parameter affine model. Then a 6-parameter affine model is obtained based on the 4-parameter affine model and the motion vector. As a result, the stereoscopic scaling effect on the VR image can be achieved based on the vector V2 in the 6-parameter affine model.

Exemplarily, in the present disclosure, by use of a motion estimation algorithm, the motion vector of the user in a direction along which the user moving towards or away from the VR image is calculated in real time based on the 6 DOF data. It should be understood that the motion vector determined in the present disclosure is in a unit of a macroblock. Generally, a macroblock is a base unit of video image encoding.

It is a conventional means in the art to determine the motion vector of the user in a direction along which the user moves towards or away from the VR image based on the 6DoF data. Details thereof will be omitted herein.

It should be noted that because VR images may be some static images, motion vectors determined based on 6 DOF data may be consistent in these static images. That is, sizes and directions of the motion vectors (motion vectors in the target direction) distributed on respective macroblocks are the same among these respective macroblocks. Certainly, in addition to this processing mode, differentiation processing may be performed based on a condition of image edge distortion in the present disclosure. For example, it is determined that a motion vector in a central region is obvious, and a motion vector in an edge region is relatively fuzzy (i.e., weak), which is not specifically limited in the present disclosure.

The image edge distortion is a distortion degree of the image of an object that is formed by an optical system relative to the object itself, and is an inherent characteristic of an optical lens. The image edge distortion is a common optical phenomenon directly caused by inconsistent magnification between an edge portion and a central portion of the lens.

At block S103, a to-be-processed object is determined from the virtual reality image.

The to-be-processed object may be any object in the VR image, such as people, an animal, a stool, a table, a vehicle, a building.

Depth information of the VR image can characterize a distance between an object in the image and a viewing angle center (such as a user). Specifically, a smaller-depth information of any object represents a smaller distance of the object from the user, and a larger-depth information of any object represents a larger distance of the object from the user. Therefore, in the present disclosure, when the to-be-processed object is determined from the VR image, depth information extraction processing can be performed on the VR image to obtain depth information of the VR image. Then, the to-be-processed object is determined from the VR image based on the depth information. In this embodiment, there is at least one to-be-processed object.

Optionally, in the present disclosure, the depth information extraction processing may be performed on the VR image through a network model or depth calculation of the VR image and other manners to obtain the depth information of the VR image. The network model is a trained model for obtaining image depth information, which is not specifically limited herein.

It is a conventional technology in the art that the depth information extraction processing is performed on the VR image to obtain the depth information of the VR image, and details thereof will be omitted herein.

In the present disclosure, after the depth information is obtained, minimum depth information may be determined, and an object corresponding to the minimum depth information is determined as the to-be-processed object.

It should be understood that different objects having the same depth information may exist in the same image, and therefore, when it is determined that the minimum depth information corresponds to different objects, all objects corresponding to the minimum depth information may be determined as the to-be-processed objects in the present disclosure.

It should be noted that operations at blocks S102 and S103 in the embodiments of the present disclosure can be performed in a sequence of: the operation at block S102 first, and then the operation at block S103; or the operation at block S103 first, and then the operation at block S102; or the operations at block S102 and block S103 simultaneously. The sequence is not specifically limited herein.

At block S104, the to-be-processed object is scaled based on the motion vector.

In the present disclosure, given that the scaling of the to-be-processed object is mainly performed based on the motion vector, the determined motion vector acts on a region where the to-be-processed object is located so as to achieve the stereoscopic scaling effect on the to-be-processed object in the VR image.

In another implementation scenario of the present disclosure, scaling requirements of different users on the to-be-processed object are different. Therefore, according to the present disclosure, before the to-be-processed object is scaled based on the motion vector, a scaling coefficient that is pre-configured in a configuration unit may be read, and a value is calculated based on the depth information of the to-be-processed object and the scaling coefficient to adjust a magnitude of the motion vector based on the value. Then, the to-be-processed object is scaled based on the adjusted motion vector.

In the embodiments of the present disclosure, a value being calculated based on the depth information of the to-be-processed object and the scaling coefficient specifically refers to multiplying the depth information of the to-be-processed object by the scaling coefficient to obtain the value.

The scaling coefficient may represent a multiple relation between the magnitude of the motion vector and the depth information of the to-be-processed object. The multiple relation may be gradient, or may be exponential, which is not specifically limited in the present disclosure. In addition, the scaling coefficient may be an empirical value when in use, and can be adaptively set based on the scaling requirements of the user, which is not specifically limited herein.

That is, in the present disclosure, the pre-configured scaling coefficient is obtained, and the magnitude of the motion vector is adjusted based on the scaling coefficient and the depth information of the to-be-processed object. In this way, personalized scaling processing can be performed on the to-be-processed object in the VR image, and requirements of the user on personalized image adjustment are met.

In the image processing method according to the present disclosure, the motion vector of the user in the target direction is determined based on the obtained 6-degree-of-freedom data, and the to-be-processed object is determined based on the obtained virtual reality image corresponding to the six-degree-of-freedom data, and then the to-be-processed object is scaled based on the motion vector. Hence, the stereoscopic scaling of the VR image displayed by the VR device can be performed based on the determined motion vector to achieve the stereoscopic scaling effect of the image, thereby satisfying the use requirements for the user.

It can be seen from the above description that, in the embodiments of the present disclosure, the to-be-processed object in the VR image is scaled based on the determined motion vector to achieve the stereoscopic scaling effect.

On the basis of the aforementioned embodiments, there is a further explanation and description for the to-be-processed object being scaled based on the motion vector in the present disclosure, and details thereof are illustrated in FIG. 7.

As illustrated in FIG. 7, the method may include operations at the following blocks:

At block S201, six-degree-of-freedom data of the virtual reality headset and a virtual reality image corresponding to the six-degree-of-freedom data are obtained.

At block S202, a motion vector of a user in a target direction is determined based on the six-degree-of-freedom data.

At block S203, a to-be-processed object is determined from the virtual reality image.

At block S204, macroblock segmentation on the virtual reality image is performed based on the to-be-processed object to obtain a plurality of first macroblocks.

At block S205, one or more target macroblocks corresponding to the motion vector are determined from the plurality of first macroblocks.

At block S206, the one or more target macroblocks are scaled based on the motion vector.

The one or more target macroblocks are configured to form the to-be-processed object, i.e., the to-be-processed object is composed of the one or more target macroblocks. It should be noted that when the to-be-processed object is composed of one or more target macroblocks, all the target macroblocks of a same identifier may be determined as one to-be-processed object based on the target macroblock identifier. The target macroblock identifier in the present disclosure refers to any information that can determine an identity of a macroblock, such as a macroblock name, which is not specifically limited herein.

Given that the scaling of the to-be-processed object is mainly based on the motion vector, and the motion vector and the to-be-processed object are determined in different ways, it is required to determine that the motion vector acts on which region of the VR image in the present disclosure, and then scale the determined region based on the motion vector. The region specifically refers to a region where the to-be-processed object is located.

Exemplarily, the macroblock segmentation may be performed on the VR image based on the to-be-processed object by using a segmentation manner such as a Coding Tree Unit to obtain the plurality of first macroblocks, as illustrated in FIG. 8. Moreover, a plurality of second macroblocks can be obtained by performing the macroblock segmentation on the VR image corresponding to the motion vector by using a segmentation manner such as the Coding Tree Unit.

The VR image corresponding to the motion vector is the same as the VR image corresponding to the obtained 6-degree-of-freedom data, and the number of macroblocks into which each image is divided is fixed, the determined number of the plurality of first macroblocks and the determined number of the plurality of second macroblocks that are obtained by dividing the same image is equal. Therefore, in the present disclosure, one or more target macroblocks can be determined from the plurality of first macroblocks based on a position of the second macroblock where the motion vector acts on the second macroblock. Then, stereoscopic scaling is performed, based on the motion vector, on the to-be-processed object formed by the one or more determined target macroblocks.

For example, it is assumed that the VR original image is shown as 9*a*, and when it is determined that the to-be-processed object in the VR original image is a small cat, an effect of stereoscopic scaling performed on the cat based on the motion vector is as shown in FIG. 9*b*.

It should be understood that, in the present disclosure, an object closest to the user can be determined as the to-be-processed object based on a distance between each object in the VR image and the user, the to-be-processed object is scaled, and other regions in the VR image are not amplified, such that the effect of the stereoscopic scaling of the VR image is achieved.

In the image processing method according to the present disclosure, the motion vector of the user in the target direction is determined based on the obtained 6-degree-of-freedom data, the to-be-processed object is determined based on the obtained virtual reality image corresponding to the six-degree-of-freedom data, and then the to-be-processed object is scaled based on the motion vector. Hence, the stereoscopic scaling processing on the VR image displayed by the VR device can be performed based on the motion vector to achieve the stereoscopic scaling effect of the image, thereby satisfying the use requirements for the user.

As an optional implementation of the present disclosure, given that there may be an error in the to-be-processed object determined from the virtual reality image based on the depth information, which causes a poor accuracy in the determined to-be-processed object, the to-be-processed object determined from the virtual reality image is further optimized in the present disclosure, such that the determined to-be-processed object is more accurate. An optimization process according to the embodiments of the present disclosure is described below with reference to FIG. 10.

As illustrated in FIG. 10, the method may include operations at the following blocks.

At block S301, six-degree-of-freedom data of the virtual reality headset and a virtual reality image corresponding to the six-degree-of-freedom data are obtained.

At block S302, a motion vector of a user in a target direction is determined based on the six-degree-of-freedom data.

At block S303, a depth information extraction processing is performed on the virtual reality image to obtain depth information.

At block S304, a semantic segmentation processing is performed on the virtual reality image to obtain a segmentation result.

Exemplarily, the semantic segmentation processing performed on the VR image can be realized through a conventional segmentation algorithm, so as to obtain the segmentation result. Details thereof are not repeated herein.

Figure 11:
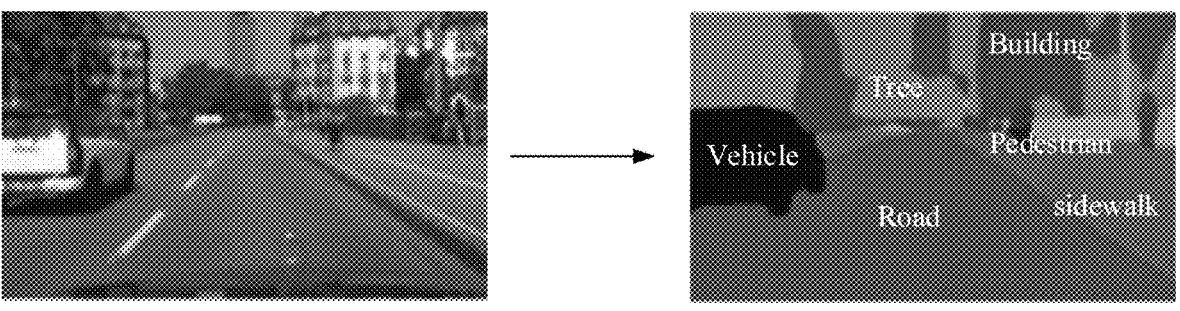
FIG. 11 is a schematic diagram of performing semantic segmentation on an image according to an embodiment of the present disclosure.

The semantic segmentation is a basic task in computer vision, which can divide an image into a plurality of blocks based on different categories, such as those illustrated in FIG. 11. Generally speaking, an image are segmented based on different contents, and respective pixels in different contents are assigned with a category label and are represented by different colors.

It should be noted that, operations at blocks S302, S303 and S304 in the embodiments of the present disclosure may be performed in an execution sequence of: the operation at block S302 first, then the operation at block S303, and finally the operation at block S304; or the operation at block S303 first, then the operation at block S304, and finally the operation at block S302; or the operation at block S304 first, then the operation at block S303, and finally the operation at block S302; or the operations at block S302, block S303, and block S304 simultaneously. The execution sequence is not specifically limited herein.

At block S305, the to-be-processed object is determined from the virtual reality image based on the depth information and the segmentation result.

Given that there may be a deviation in the to-be-processed object determined from the VR image based on the depth information, a semantic segmentation processing is performed on the VR image in the present disclosure so as to obtain a segmentation result. Then, an accurate to-be-processed object is determined from the VR image based on a combination of the depth information and the segmentation result.

Exemplarily, matching and calibration operations may be performed based on the depth information and the segmentation result so as to determine all to-be-processed objects from the VR image. The specific implementation process is as follows. Specifically, a first candidate object is determined from the VR image based on the depth information, and a second candidate object is determined from the VR image based on the segmentation result. Then, a matching process is performed on the first candidate object and the second candidate object to determine whether the first candidate object matches with the second candidate object. That is, it is determined whether the first candidate object is consistent with the second candidate object. If the first candidate object does not match with the second candidate object, the first candidate object corresponding to the depth information is calibrated based on the second candidate object corresponding to the semantic segmentation result, and the second candidate object is determined as a final to-be-processed object. If the first candidate object matches with the second candidate object, the first candidate object or the second candidate object is determined as the final to-be-processed object.

At block S306, the to-be-processed object is scaled based on the motion vector.

In the image processing method according to the present disclosure, the motion vector of the user in the target direction is determined based on the obtained 6-degree-of-freedom data, and the to-be-processed object is determined based on the obtained virtual reality image corresponding to the six-degree-of-freedom data, and then the to-be-processed object is scaled based on the motion vector. Hence, the stereoscopic scaling processing on the VR image displayed by the VR device can be achieved based on the determined motion vector, so as to achieve the stereoscopic scaling effect of the image, thereby satisfying the use requirements for the user. In addition, the semantic segmentation processing is performed on the virtual reality image, and the to-be-processed object determined based on the depth information is calibrated based on the segmentation result, such that the ultimately determined to-be-processed object is more accurate and the user experience is further improved.

Figure 12:
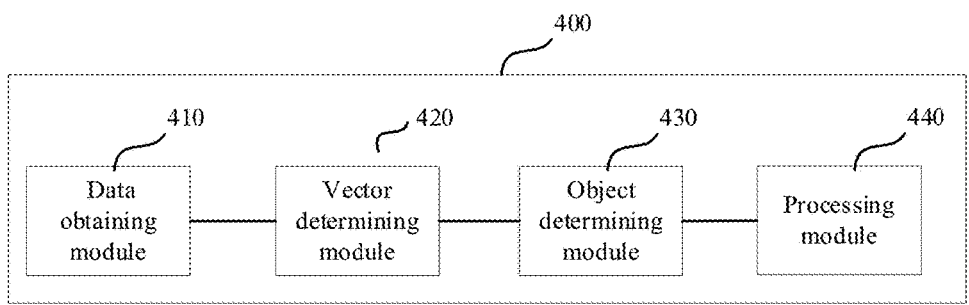
FIG. 12 is a schematic block diagram of an image processing apparatus according to an embodiment of the present disclosure.

Referring to FIG. 12, an image processing apparatus according to an embodiment of the present disclosure is described below. FIG. 12 is a schematic block diagram of an image processing apparatus according to an embodiment of the present disclosure. It should be noted that the image processing apparatus according to the present disclosure is configured in a virtual reality headset.

An image processing apparatus 400 includes a data obtaining module 410, a vector determining module 420, an object determining module 430, and a processing module 440.

The data obtaining module 410 is configured to obtain six-degree-of-freedom data of the virtual reality headset and a virtual reality image corresponding to the six-degree-of-freedom data. The vector determining module 420 is configured to determine a motion vector of a user in a target direction based on the 6-degree-of-freedom data. The object determination module 430 is configured to determine a to-be-processed object from the virtual reality image. The processing module 440 is configured to scale the to-be-processed object based on the motion vector.

In an optional implementation of the embodiments of the present disclosure, the object determining module 430 is specifically configured to: perform a depth information extraction processing on the virtual reality image to obtain depth information; and determine the to-be-processed object from the virtual reality image based on the depth information.

In an optional implementation of the embodiments of the present disclosure, the object determining module 430 is specifically configured to: perform a depth information extraction processing on the virtual reality image to obtain depth information; perform a semantic segmentation processing on the virtual reality image to obtain a segmentation result; and determine the to-be-processed object from the virtual reality image based on the depth information and the segmentation result.

In an optional implementation of the embodiments of the present disclosure, the processing module 440 includes: a macroblock segmentation unit configured to perform macroblock segmentation on the virtual reality image based on the to-be-processed object to obtain a plurality of first macroblocks; a macroblock determining unit configured to determine, from the plurality of first macroblocks, one or more target macroblocks corresponding to the motion vector; and a macroblock scaling unit configured to scale the one or more target macroblocks based on the motion vector.

In an optional implementation of the embodiments of the present disclosure, the macroblock determining unit is specifically configured to: perform macrblock segmentation on a virtual reality image corresponding to the motion vector to obtain a plurality of second macroblocks; determine a second macroblock corresponding to the motion vector; and determine the one or more target macroblocks from the plurality of first macroblocks based on the second macroblock.

In an optional implementation of the embodiments of the present disclosure, the to-be-processed object is composed of the one or more target macroblocks.

In an optional implementation of the embodiments of the present disclosure, the image processing apparatus 400 further includes an adjustment module.

The adjustment module is configured to adjust a magnitude of the motion vector based on depth information of the to-be-processed object and a scaling coefficient of the to-be-processed object.

In the image processing apparatus according to the embodiments of the present disclosure, the motion vector of the user in the target direction is determined based on the obtained 6-degree-of-freedom data, the to-be-processed object is determined based on the obtained virtual reality image corresponding to the six-degree-of-freedom data, and then the to-be-processed object is scaled based on the motion vector. Hence, based on the determined motion vector, the stereoscopic scaling of the VR image displayed by the VR device is performed to achieve the stereoscopic scaling effect of the image, thereby satisfying the use requirements for the user.

It should be understood that the apparatus embodiments may correspond to the method embodiments, and reference may be made to the method embodiments for similar description of the apparatus embodiments. Details thereof will be omitted here to avoid repetition. In some embodiments, the apparatus 400 illustrated in FIG. 12 may perform the method embodiments corresponding to FIG. 4, and the above and other operations and/or functions of modules in the apparatus 400 are respectively configured to perform the corresponding procedures of any of the method embodiments corresponding to FIG. 4. Details thereof will be omitted here for simplicity.

The apparatus 400 according to the embodiments of the present disclosure are described above from the perspective of functional modules in conjunction with the accompanying drawings. It should be understood that the functional modules can be implemented in a form of hardware, instructions in a form of software, or a combination of hardware and software modules. Specifically, procedures of the method embodiments in the first aspect of the present disclosure can be completed by hardware integrated logic circuits in a processor and/or instructions in the form of software. The procedures of the method that are disclosed in combination with the embodiments in the first aspect of the present disclosure can be directly embodied as being executed by a hardware decoding processor, or executed by a combination of hardware and software modules in the decoding processor. Optionally, the software module may be located in a mature storage medium in the field such as a random access memory, a flash memory, a Read-Only Memory (ROM), a Programmable ROM (PROM), an electrically erasable programmable memory, and a register. The storage medium is located in the memory. The processor reads information from the memory, and completes the procedures in the above method embodiments in the first aspect in combination with hardware in the processor.

Figure 13:
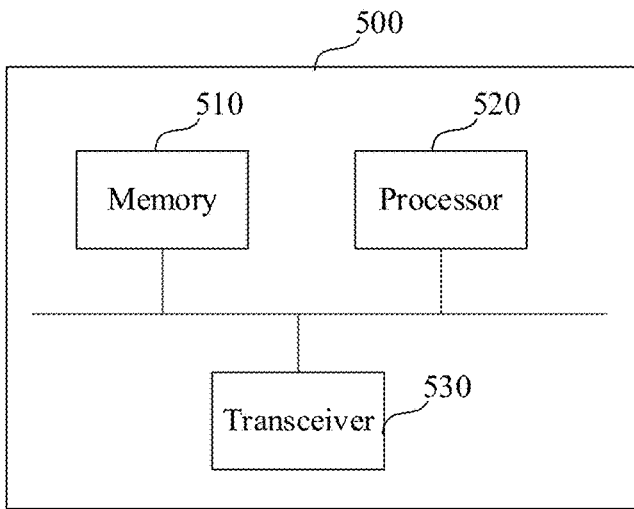
FIG. 13 is a schematic block diagram of an electronic device according to an embodiment of the present disclosure.

FIG. 13 is a schematic block diagram of an electronic device according to an embodiment of the present disclosure. The electronic device is a virtual reality headset.

As illustrated in FIG. 13, the electronic device 500 may include a memory 510 and a processor 520. The memory 510 is configured to store a computer program and transmit codes of the computer program to the processor 520. That is, the processor 520 can invoke and execute the computer program from the memory 510 to implement the image processing method according to any of the embodiments of the present disclosure.

For example, the processor 520 can be configured to execute the image processing method embodiments based on instructions in the computer program.

In some embodiments of the present disclosure, the processor 520 may include, but is not limited to, a general-purpose processor, a Digital Signal Processor (DSP), an Application Specific Integrated Circuit (ASIC), a Field Programmable Gate Array (FPGA), or another programmable logic device, a discrete gate or a transistor logic device, a discrete hardware component, etc.

In some embodiments of the present disclosure, the memory 510 may include, but is not limited to, a transitory memory and/or a non-transitory memory. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which serves as an external cache. By way of illustration rather than limitation, many forms of RAMs are available, e.g., a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)), and a Direct Rambus RAM (DR RAM).

In some embodiments of the present disclosure, the computer program may be divided into one or more modules. The one or more modules may be stored in the memory 510 and executed by the processor 520 to complete the image processing method provided by the present disclosure. The one or more modules may be a series of computer program instruction segments capable of completing specific functions. The instruction segments are used to describe an execution process of the computer program in the electronic device.

As illustrated in FIG. 13, the electronic device may further include a transceiver 530 that may be connected to the processor 520 or the memory 510.

The processor 520 may control the transceiver 530 to communicate with other devices, and specifically, may send information or data to other devices, or receive information or data sent by other devices. The transceiver 530 may include a transmitter and a receiver. The transceiver 530 may further include one or more antennas.

It should be understood that various components in the electronic device are connected via a bus system. In addition to a data bus, the bus system includes a power bus, a control bus, and a status signal bus.

Figure 14:
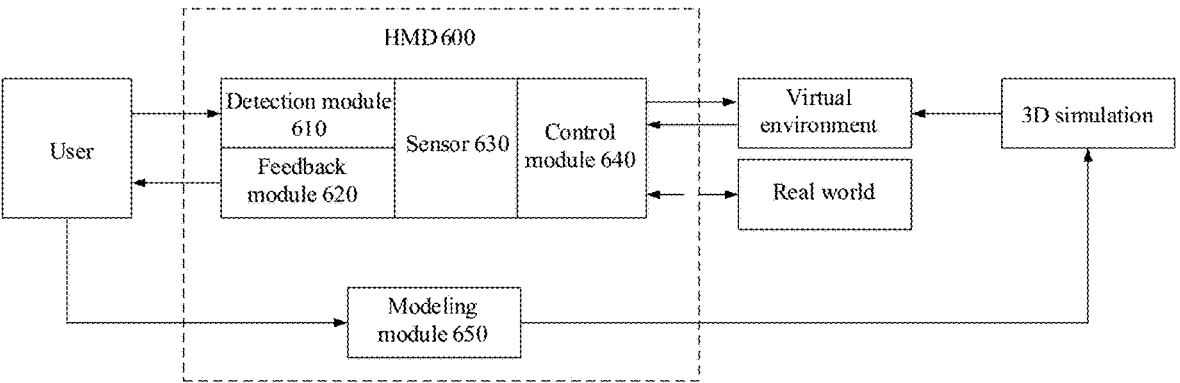
FIG. 14 is a schematic block diagram of an HMD device as the electronic device according to an embodiment of the present disclosure.

In the embodiments of the present disclosure, when the electronic device is a Head Mount Display (HMD), an embodiment of the present disclosure provides a schematic block diagram of an HMD, as illustrated in FIG. 14.

As illustrated in FIG. 14, main function modules of an HMD 600 may include, but are not limited to, a detection module 610, a feedback module 620, a sensor 630, a control module 640, and a modeling module 650.

The detection module 610 is configured to use various sensors to detect an operation command of the user or instructions sent by a handle, and act on the virtual environment, e.g., continuously update the image displayed on a display screen following sight of the user, so as to realize interaction between the user and the virtual scene. For example, a displayed content is continuously updated based on a detected rotation direction of the user's head.

The feedback module 620 is configured to receive data from the sensor and provide real-time feedback to the user. For example, the feedback module 620 may generate feedback instructions based on operation data of the user and output the feedback instructions.

On one hand, the sensor 630 is configured to receive an operation command from the user and causes the operation command to act on the virtual environment. On the other hand, the sensor 630 is configured to provide a result generated after the operation to the user in various feedback forms.

The control module 640 is configured to control the sensor and various input/output devices, including obtaining data of the user such as actions, voices, etc., and outputting perception data, such as images, vibrations, temperatures, sounds, etc., to act on the user, the virtual environment, and the real world. For example, the control module 640 can obtain a gesture, a voice, etc., of the user.

The modeling module 650 is configured to construct a three-dimensional model of the virtual environment, and may further include various feedback mechanisms such as sound and tactile sensation in the three-dimensional model.

It should be understood that functional modules in the HMD 600 are connected via a bus system. In addition to a data bus, the bus system also includes a power bus, a control bus, and a status signal bus, etc.

The present disclosure further provides a computer storage medium. The computer storage medium has a computer program stored thereon. The computer program, when executed by a computer, causes the computer to perform the method in the above-mentioned method embodiments.

The embodiments of the present disclosure further provide a computer program product. The computer program product includes program instructions. The program instructions, when executed on an electronic device, cause the electronic device to perform the method in any of the above-mentioned method embodiments.

When implemented by software, the above embodiments can be implemented in the form of a computer program product in whole or in part. The computer program product includes one or more computer instructions. When the computer program instructions are loaded and executed on a computer, the processes or functions described in the embodiments of the present disclosure are provided in whole or in part. The computer may be a general purpose computer, an application specific computer, a computer network, or any other programmable device. The computer instructions may be stored in a computer-readable storage medium or transmitted from one computer-readable storage medium to another computer-readable storage medium. For example, the computer instructions may be transmitted from one website, computer, server, or data center to another website, computer, server, or data center via a wired manner (such as coaxial cable, optical fiber, Digital Subscriber Line (DSL)) or a wireless manner (such as infrared, wireless, microwave, etc.). The computer-readable storage medium may be any usable medium that can be accessed by a computer or a data storage device such as a server or a data center integrated with one or more usable media. The usable medium may be a magnetic medium (for example, a floppy disk, a hard disk, a magnetic tape), an optical medium (for example, a Digital Video Disc (DVD)), or a semiconductor medium (for example, a Solid State Disk (SSD)), etc.

It can be appreciated by those skilled in the art that the modules and the steps of the algorithm of examples described in combination with the embodiments disclosed herein may be implemented in electronic hardware or a combination of computer software and electronic hardware, depending on specific applications and design constraint conditions of technical solutions. For each specific application, professionals and technicians can use different methods to implement the described functions, but such implementation should not be considered as going beyond the scope of the present disclosure.

In several embodiments provided by the present disclosure, it is to be understood that, the devices, apparatuses and methods disclosed can be implemented in other ways. For example, the apparatus embodiments described above are merely exemplary. For example, the modules are merely divided based on logic functions. In practical implementation, the modules can be divided in other manners. For example, multiple modules or components can be combined or integrated into another system, or some features can be omitted or not executed. In addition, mutual coupling or direct coupling or communication connection described or discussed can be implemented as indirect coupling or communication connection via some interfaces, apparatuses or modules, and may be electrical, mechanical or in other forms.

The modules illustrated as separate components may be or not be separated physically, and components shown as modules may be or not be physical modules, i.e., may be located at one position, or distributed onto multiple network units. It is possible to select some or all of the modules according to actual needs, for achieving the objective of embodiments of the present disclosure. For example, respective functional modules in respective embodiments of the present disclosure can be integrated into one processing module, or can be present as separate physical entities. It is also possible to integrate two or more modules into one module.

The above description merely illustrates specific implementations of the present disclosure, and the scope of the present disclosure is not limited thereto. Any change or replacement within the technical scope disclosed by the present disclosure that can be easily conceived by those skilled in the art should fall in the protection scope of the present disclosure. The protection scope of the present disclosure is defined only by the claims.

The invention claimed is:

1. An image processing method, applied in a virtual reality headset and comprising:
    obtaining six-degree-of-freedom data of the virtual reality headset and a virtual reality image corresponding to the six-degree-of-freedom data;
    determining a motion vector of a user in a target direction based on the six-degree-of-freedom data;
    performing a depth information extraction processing on the virtual reality image to obtain depth information;
    performing a semantic segmentation processing on the virtual reality image to obtain a segmentation result;
    determining a to-be-processed object from the virtual reality image based on the depth information and the segmentation result; and
    scaling the to-be-processed object based on the motion vector.

2. The method according to claim 1, wherein said scaling the to-be-processed object based on the motion vector comprises:
    performing macroblock segmentation on the virtual reality image based on the to-be-processed object to obtain a plurality of first macroblocks;

determining, from the plurality of first macroblocks, one or more target macroblocks corresponding to the motion vector; and
    scaling the one or more target macroblocks based on the motion vector.

3. The method according to claim 2, wherein said determining, from the plurality of first macroblocks, the one or more target macroblocks corresponding to the motion vector comprises:
    performing macroblock segmentation on a virtual reality image corresponding to the motion vector to obtain a plurality of second macroblocks;
    determining one or more second macroblocks corresponding to the motion vector; and
    determining the one or more target macroblocks from the plurality of first macroblocks based on the one or more second macroblocks.

4. The method according to claim 2, wherein the to-be-processed object is composed of the one or more target macroblocks.

5. The method according to claim 1, further comprising, prior to said scaling the to-be-processed object based on the motion vector:
    adjusting a magnitude of the motion vector based on depth information of the to-be-processed object and a scaling coefficient of the to-be-processed object.

6. An electronic device, comprising:
a processor;
a memory configured to store a computer program,
wherein the processor is configured to invoke and execute the computer program stored in the memory to:
    obtain six-degree-of-freedom data of a virtual reality headset and a virtual reality image corresponding to the six-degree-of-freedom data;
    determine a motion vector of a user in a target direction based on the six-degree-of-freedom data;
    perform a depth information extraction processing on the virtual reality image to obtain depth information;
    perform a semantic segmentation processing on the virtual reality image to obtain a segmentation result;
    determine a to-be-processed object from the virtual reality image based on the depth information and the segmentation result;
    scale the to-be-processed object based on the motion vector.

7. The electronic device according to claim 6, wherein the processor is further configured to invoke and execute the computer program stored in the memory to:
    perform macroblock segmentation on the virtual reality image based on the to-be-processed object to obtain a plurality of first macroblocks;
    determine, from the plurality of first macroblocks, one or more target macroblocks corresponding to the motion vector; and
    scale the one or more target macroblocks based on the motion vector.

8. The electronic device according to claim 7, wherein the processor is further configured to invoke and execute the computer program stored in the memory to:
    perform macroblock segmentation on a virtual reality image corresponding to the motion vector to obtain a plurality of second macroblocks;
    determine one or more second macroblocks corresponding to the motion vector; and
    determine the one or more target macroblocks from the plurality of first macroblocks based on the one or more second macroblocks.

9. The electronic device according to claim 7, wherein the to-be-processed object is composed of the one or more target macroblocks.

10. The electronic device according to claim 6, wherein the processor is further configured to invoke and execute the computer program stored in the memory to, prior to said scaling the to-be-processed object based on the motion vector;

adjust a magnitude of the motion vector based on the depth information and a scaling coefficient of the to-be-processed object.

11. A non-transitory computer-readable storage medium, configured to store a computer program, wherein the computer program enables a computer to:

obtain six-degree-of-freedom data of a virtual reality headset and a virtual reality image corresponding to the six-degree-of-freedom data;

determine a motion vector of a user in a target direction based on the six-degree-of-freedom data;

perform a depth information extraction processing on the virtual reality image to obtain depth information;

perform a semantic segmentation processing on the virtual reality image to obtain a segmentation result;

determine a to-be-processed object from the virtual reality image based on the depth information and the segmentation result; and scale the to-be-processed object based on the motion vector.

12. The non-transitory computer-readable storage medium according to claim 11, wherein the computer program further enables the computer to:

perform macroblock segmentation on the virtual reality image based on the to-be-processed object to obtain a plurality of first macroblocks;

determine, from the plurality of first macroblocks, one or more target macroblocks corresponding to the motion vector; and scale the one or more target macroblocks based on the motion vector.

13. The non-transitory computer-readable storage medium according to claim 12, wherein the computer program further enables the computer to:

perform macroblock segmentation on a virtual reality image corresponding to the motion vector to obtain a plurality of second macroblocks;

determine one or more second macroblocks corresponding to the motion vector; and determine the one or more target macroblocks from the plurality of first macroblocks based on the one or more second macroblocks.

14. The non-transitory computer-readable storage medium according to claim 12, wherein the to-be-processed object is composed of the one or more target macroblocks.

15. The non-transitory computer-readable storage medium according to claim 11, wherein the computer program further enables the computer to, prior to said scaling the to-be-processed object based on the motion vector:

adjust a magnitude of the motion vector based on the depth information and a scaling coefficient of the to-be-processed object.

\* \* \* \* \*